United States Patent
Konijn

(12) 
(10) Patent No.: US 6,460,833 B2
(45) Date of Patent: Oct. 8, 2002

(54) GAS-LIQUID CONTACTING COLUMN

(75) Inventor: Gerrit Konijn, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/757,881

(22) Filed: Jan. 10, 2001

(65) Prior Publication Data

US 2001/0013667 A1 Aug. 16, 2001

(30) Foreign Application Priority Data

Feb. 16, 2000 (EP) .............................................. 00200515

(51) Int. Cl.$^7$ ................................................. B01F 3/04
(52) U.S. Cl. ................... 261/114.1; 261/114.5
(58) Field of Search ............. 261/114.1, 114.2, 261/114.3, 114.4, 114.5

(56) References Cited

U.S. PATENT DOCUMENTS

| | | | | |
|---|---|---|---|---|
| 3,658,306 A | * | 4/1972 | Jones ....................... | 261/114.1 |
| 3,700,216 A | * | 10/1972 | Uitti et al. ................ | 261/114.1 |
| 3,729,179 A | * | 4/1973 | Keller ...................... | 261/114.4 |
| 4,273,618 A | * | 6/1981 | Strang, Sr. ............... | 261/114.5 |
| 4,499,035 A | * | 2/1985 | Kirkpatrick et al. ..... | 261/114.3 |
| 6,299,146 B1 | * | 10/2001 | Yu et al. .................. | 261/114.3 |

FOREIGN PATENT DOCUMENTS

| | | | |
|---|---|---|---|
| DE | 1444472 | 11/1968 | |
| DE | 2219255 | 11/1973 | |
| EP | 1422131 | 1/1976 | |
| EP | 542538 | 11/1992 | |
| GB | 1221391 | 2/1971 | |
| JP | 6-154503 | * 6/1994 | .............. 261/114.1 |
| WO | 95/25583 | 9/1995 | |
| WO | 97/37741 | 4/1997 | |
| WO | 98/28056 | 11/1997 | |
| WO | 98/39077 | 2/1998 | |

* cited by examiner

*Primary Examiner*—C. Scott Bushey

(57) ABSTRACT

The invention relates to a gas-liquid contacting column having a number of axially spaced contacting trays, which trays have one or more liquid receiving areas and one or more downcomers, which liquid receiving areas and downcomers are spaced in a bubble area and which downcomer has at its upper end a liquid receiving opening and at its lower end one or more downward directed liquid discharging openings, which openings are positioned above the liquid receiving area of the consecutive lower contacting tray and positioned at more than 10% of the tray spacing above this liquid receiving area, wherein along the boundary of the liquid receiving area and the bubble area a weir is present.

7 Claims, 2 Drawing Sheets

GAS-LIQUID CONTACTING COLUMN

FIELD OF THE INVENTION

The invention is related to a gas-liquid contacting column comprising a plurality of axially spaced contacting trays, which trays comprise one or more liquid receiving areas and one or more downcomers, which liquid receiving areas and downcomers are spaced in a bubble area and which downcomer has at its upper end a liquid receiving opening and at its lower end one or more downward directed liquid discharging openings, which openings are positioned above the liquid receiving area of the consecutive lower contacting tray and positioned at more than 10% of the tray spacing above this liquid receiving area.

BACKGROUND OF THE INVENTION

Such a column is described in U.S. Pat. No. 4,550,000. This publication describes a column provided with rectangular shaped downcomers and a bubble area. A liquid receiving area is present on the tray just below the liquid discharge openings of the downcomer of the upper consecutive tray. The downcomer is a so-called truncated downcomer because the liquid discharge openings are spaced away from the tray just below. Bubble area is present between the liquid receiving area and the downcomer opening. The liquid receiving area is covered with rectangular structures of expanded metal. These structures are meant to avoid liquid passing directly through the gas openings present in the liquid receiving area.

The column according to U.S. Pat. No. 4,550,000 is however not suited to handle higher liquid loads because the velocity of the liquid being discharged from the liquid discharge openings is of such magnitude that it will pass the rectangular structure of expanded metal and the gas openings present below said structure. For this reason one skilled in the art will typically design the receiving area on the tray without openings or with special openings like for example described in U.S. Pat. No. 5,702,647.

When trying to increase the liquid and/or gas flows of the gas-liquid contacting column as described above a maximum load will however be observed. Higher loads will result in that the column fails to function as a liquid-gas contactor or separator due to a phenomena known as flooding. Flooding is described as excessive accumulation of liquid inside the column. The well known flooding mechanisms are downcomer back-up, jet flooding and downcomer choking. These mechanisms are described in Distillation Design, Henry Z. Kister, McGraw-Hill Inc., 1992, page 267–291. According to this publication downcomer back-up is due to a build-up of liquid inside the downcomer causing the liquid to back-up on the tray leading to liquid accumulation on that tray. The liquid height in the downcomer is determined by the tray pressure drop, liquid height on the tray and frictional, losses in the downcomer and downcomer slot area. Jet flooding or entrainment flooding is caused by a too high gas velocity leading to the entrainment of liquid, either by droplets or froth, to the tray above. The liquid will accumulate and leads to flooding. Downcomer choking is caused by a too high aerated liquid velocity in the downcomer. At a certain velocity the friction losses in the downcomer and downcomer entrance become excessive, and the frothy gas-liquid mixture cannot be transported to the tray below, causing liquid accumulation on the tray. With the term froth is to be understood any gas-liquid mixture present on the tray not depending on any flow regime.

The problem to be solved by the present invention is increase the froth handling capacity of a downcomer and thus to increase the capacity of the tray.

SUMMARY OF THE INVENTION

This object is achieved with the following column. Gas-liquid contacting column comprising a plurality of axially spaced contacting trays, which trays comprise one or more liquid receiving areas and one or more downcomers, which liquid receiving areas and downcomers are spaced in a bubble area and which downcomer has at its upper end a liquid receiving opening and at its lower end one or more downward directed liquid discharging openings, which openings are positioned above the liquid receiving area of the consecutive lower contacting tray and positioned at more than 10% of the tray spacing above this liquid receiving area, wherein along the boundary of the liquid receiving area and the bubble area a weir is present.

It has been found that a column according the invention can handle a higher liquid load and therefore has an increased capacity when compared to state of the art columns. Without wanting to limit the invention by the following theory it is believed that the weir decreases the horizontal velocity of the liquid just above the tray flowing towards the downcomer opening. Because of this lower liquid velocity a more controlled entering of the liquid into the downcomer opening is achieved resulting in less downcomer choking.

A weir along the boundary of the liquid receiving area and the bubble area is described in WO-A-9839077. The difference with the present invention is that the downcomer is not a truncated downcomer as in the present invention. In other words, the liquid discharge opening of the disclosed downcomer is situated just above the tray. A next difference is that the weir is placed to create a liquid seal in order to prevent gas from entering the downcomer from below. In the present invention the weir functions as a velocity breaker and not as means to create a liquid seal.

EP-A-542538 discloses a weir situated below a downcomer liquid discharge opening. The difference with the present invention is that the downcomer is not a truncated downcomer as in the present invention. The weir disclosed in this publication serves to improve an uniform flow of the liquid on the entire bubble area.

As explained above the downcomers are so-called truncated downcomers, its lower end is preferably positioned at more than 25% of the tray spacing above the liquid receiving area of the lower consecutive tray. The tray spacing is the distance between two consecutive contacting trays in the column. Suitably the tray spacing is between 0.2 and 1 m. Generally the liquid discharge openings of the downcomer are positioned at less than 70% and preferably at less than 50% of the tray spacing above the liquid receiving area of the lower consecutive tray.

In order to avoid a liquid seal between the liquid discharge openings and the liquid receiving area the vertical height of the weir is smaller than the distance between the liquid discharge opening and the liquid receiving area. More preferably the vertical height of the weir is less than 50% of the distance between the liquid discharge opening and the liquid receiving area. A suitable vertical height of the weir is between 0.01 and 0.05 m. The vertical weir height may vary along its length. The average height of such a weir will be according to the ranges described above.

The weir can be disposed vertically or inclined. The weir may run along the entire boundary between the liquid. receiving area and the bubble area or may optionally be interrupted. The weir may be solid. Preferably openings are present in the weir.

The downcomer may for example have a square, rectangular, circular or segmental cross-section at tray level.

Its lower part will normally have a corresponding form. This lower part is provided with liquid discharge openings. If these liquid discharge openings are uniformly distributed along the lower end of the downcomer, the corresponding liquid receiving area will also have the corresponding square, rectangular, circular or segmental form. The downcomer is preferably a rectangular downcomer because the advantages of the present invention are especially achieved in combination with such a downcomer design.

The liquid receiving area may be smaller than the downcomer opening area because for example the liquid discharge openings are not evenly distributed at the lower end and/or because the downcomer walls are sloped towards each other in the downward direction. Liquid discharge openings present in the lower end of a rectangular downcomer may be grouped in several different groups of openings along the length of the downcomer. The liquid receiving area will then correspond to these groups of openings and will thus not have the corresponding rectangular form of the downcomer opening. Preferably none or special openings like fixed valve openings or openings as disclosed in for example U.S. Pat. No. 5,702,647, are present in the liquid receiving area.

The downcomer walls are preferably sloped in order to limit the liquid receiving area and optimise the bubble area. A large bubble area is advantageous in order to improve gas-liquid contacting. Above this bubble area most of the gas-liquid contacting takes place when gas moves upwards through the openings in the bubble area and contacts the liquid flowing from the liquid discharge openings to the downcomer opening. The walls are preferably sloped at an angle of 1 to 45 degrees relative to the vertical. The lower end of the downcomer is preferably provided with a cover plate, which cover plate is provided with a plurality of liquid discharge openings. The form of these openings may be freely chosen and can be for example of a square, circular or slit design. The liquid discharge slits in a rectangular downcomer may for example run parallel or perpendicular to the longitudinal side of the downcomer.

In a preferred embodiment the liquid discharge openings are grouped along the length of a rectangular downcomer. The weir in this embodiment is preferably present along the boundary of the respective grouped liquid receiving areas and the bubble area. Optionally only a weir is present along the boundaries which run parallel to the longitudinal side of the downcomer. An advantage of this grouped layout is that by adding additional gas openings, below the downcomer at positions where no liquid discharge openings are present above, additional bubble area can be created.

With a rectangular downcomer is also meant a downcomer opening wherein its smaller end side, nearest to the circumferential of the tray, runs along this circumferential, resulting that these smaller end sides are not parallel arranged relative to each other. This design of the downcomer opening ensures a maximum opening area on the tray.

The tray layout may be such that the rectangular downcomers are arranged parallel relative to each other in one row. Between consecutive downcomers bubble area and liquid receiving area is present on a tray. Preferably a row comprising a plurality of sequences of downcomer, bubble area and liquid receiving area is used. Two consecutive trays are then so arranged that a downcomer will be positioned above a liquid receiving area. At both ends of such a row a segmental downcomer may be present. This segmental downcomer will have a downcomer opening which at one end runs parallel to the rectangular downcomers and at the other end follows the circumferential of the tray.

Preferably rectangular downcomers are arranged on the tray in a so-called staggered arrangement. In this arrangement the tray is divided along a horizontal diametrical line in two tray sections, each tray section provided with one or more parallel arranged rectangular downcomers positioned perpendicular to the diametrical line. These downcomers extend from the wall, or near to the wall, to the diametrical line of the tray, such that the ends of the downcomers in one tray section meet the diametrical line alternating with the ends of the downcomers in the opposite tray section. Preferably 1-10 rectangular shaped parallel downcomers are present in one tray section. Additionally one or more segmental downcomers may be present on a tray section where the diametrical line meets the column wall. Such a segmental downcomer will have an opening which runs parallel to the longitudinal side of the rectangular downcomers, along the circumferential of the tray and along part of the diametrical line.

When such trays having a staggered tray layout are placed in a column, two consecutive trays will be mirror images of each other with the diametrical line as mirror. This ensures that a downcomer is positioned above the liquid receiving area of the tray below. A staggered tray is preferably constructed such that the downcomer is supported at one smaller end by central supporting beam placed along the diametrical line and at the other end by a circumferential beam running along the inner wall of the column as for example described in GB-A-1422131.

For the present invention it is not critical which kind of openings are used in the bubble area of the tray. Examples of possible openings are sieve tray openings, valve tray openings, bubble cap openings and fixed valve opening. Examples of these openings can be found in general text books such as the afore-mentioned Kister on pages 260–267 and in U.S.-RE-27908, U.S. Pat. No. 5,120,474, WO-A-9828056, WO-A-9737741, U.S. Pat. No. 5,911,922, U.S. Pat. Nos. 3,463,464 and 5,454,989.

Preferably a second weir, also referred to as an overflow weir, is present on the tray. This second weir is located on or about the boundary of the bubble area and the downcomer opening which ensures that a certain pre-selected amount of liquid is present on the upper surface of the bubble area. The height of this second weir is preferably lower than the distance between the liquid discharge openings of the downcomer of the tray above and the liquid receiving area. This to ensure that no liquid seal is formed between said liquid discharge opening and the liquid receiving area. Preferably this overflow weir has a height of between 0.025 and 0.15 m.

BRIEF DESCRIPTION OF THE DRAWINGS

The column according the invention will be illustrated making use of FIGS. 1–3.

DETAILED DESCRIPTION OF THE INVENTION

Figure 1:
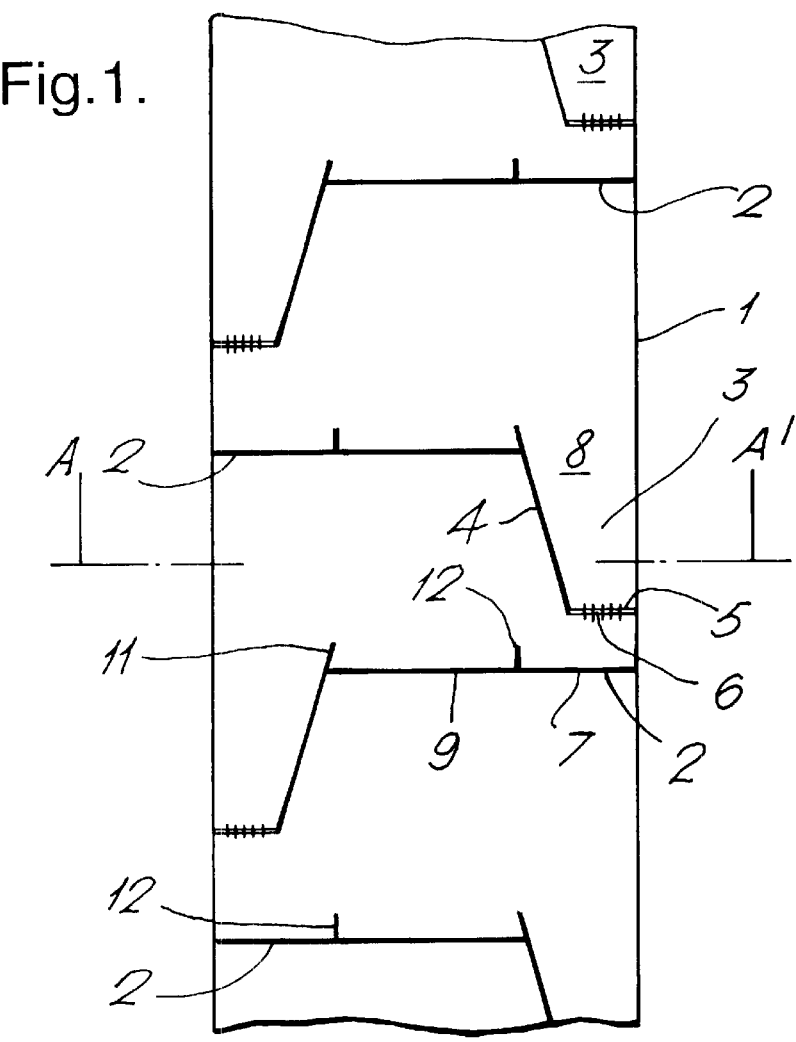
FIG. 1 is a cross-sectional view along its vertical axis of part of a column according to the invention.
Figure 2:
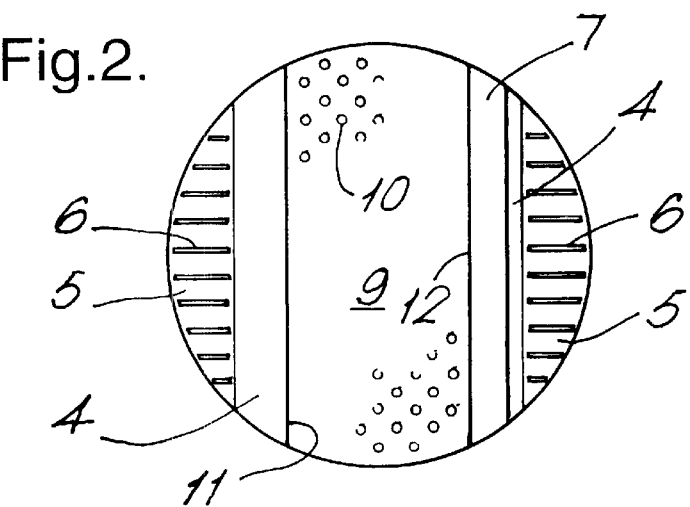
FIG. 2 is a cross-sectional view along line AA' of FIG. 1.

FIG. 1 shows part of a column 1 according to the invention in which four contacting trays 2 are shown. The tray 2 has one downcomer 3 provided with a sloped wall 4, a cover plate 5, which cover plate 5 is provided with a plurality of downward directed liquid discharge openings 6. Below these openings 6 a liquid receiving area 7 is present on the tray 2 just below. No gas openings are present in the liquid receiving area. On tray 2 a bubble area 9 is present between liquid receiving area 7 and downcomer opening 8. The bubble area 9 is provided with gas openings 10 which are shown in FIG. 2. On the boundary of the bubble area 9 and the downcomer openings 8 an overflow weir 11 is present. Along the boundary of the liquid receiving area 7 and bubble area 9, placed more towards the bubble area 9, a weir 12 is present.

FIG. 2 is a cross-sectional top view AA' of FIG. 1 illustrating the above features.

Figure 3:
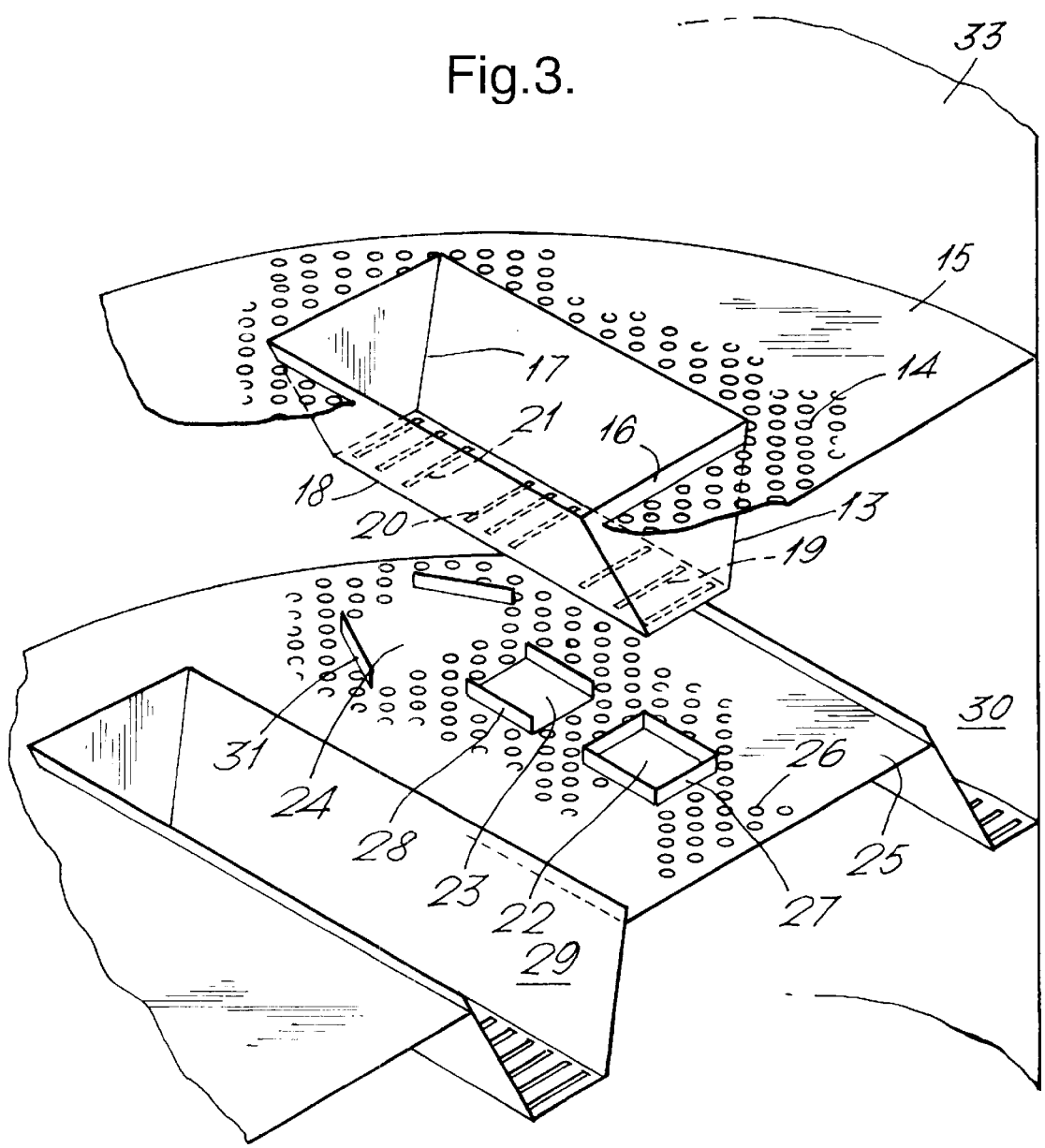
FIG. 3 is a three dimensional view of part of the column according to the invention showing two contacting trays provided with rectangular and segmented downcomers.

FIG. 3 shows a rectangular downcomer 13 placed in bubble area 14 (partly shown) on contacting tray 15 (partly shown). The downcomer 13 is provided with an overflow weir 16 and sloped downcomer walls 17 and a cover plate 18 at its lower end. In the cover plate 18 three groups 19, 20, 21 of downward directed liquid discharge slits are present. Below the discharge openings groups 19, 20, 21 three corresponding liquid receiving areas 22, 23, 24 are present on contacting tray 25 (partly shown) placed just below contacting tray 15. Three possible different embodiments are illustrated of how the weir can be placed along the boundary of liquid receiving areas 22, 23, 24 and the bubble area 26 (partly shown) on tray 25. It will be recognised that one of these embodiments or combinations may be present in a column according to the invention. The weir 27 present at area 22 runs along the entire boundary of liquid receiving area 22 and the bubble area 26. The weir 28 at area 23 only runs along the part of the boundary of bubble area and liquid receiving area which runs parallel to the longitudinal side of the rectangular downcomer 13. This weir 28 should be sufficient to reduce the liquid velocity over bubble area 26 towards the rectangular downcomer opening 29 and the segmented downcomer opening 30. The distance between the two parallel weirs 28 is preferably between one and two times the width of the liquid receiving area 23. The weir 31 at area 24 is as weir 28, except that the weir 31 runs under an angle with the longitudinal center of the downcomer 13. This angle will result in that apart from a velocity reduction some of the liquid will be directed away from the column wall 33 and towards the bubble area between liquid receiving areas 23 and 24.

The column according to the invention is preferably used as a distillation column or absorption column. In absorption columns a downwardly moving liquid is contacted with a upwardly moving gas. In a distillation column one or more components are typically separated from a feed. Typically the feed in a distillation column is supplied to an intermediate position in the column, wherein trays are present above and below said inlet position. Such a column is further provided with reboiler, condensation and reflux means. The column is preferably used to contact gas and liquids, wherein the gas-liquid system may be of the non-foaming or foaming type.

"The invention is also related to a method to retrofit an existing column provided with trays having truncated downcomers as described above by adding a weir and arriving at the column according to the invention. Adding the weir can be simply achieved by welding or mechanically fixing a strip on the tray. A simple method" to improve the capacity of a gas-liquid contacting column is thus provided.

The invention will be illustrated with the following non-limiting examples:

EXAMPLE 1

A gas-liquid contacting column as in FIG. 1 was provided with cross-over sieve trays at 0.55 m tray spacing. The trays were provided with one trunctated downcomer having downward directed liquid discharge openings positioned at 0.1 m above tray level. The tray was further provided with a vertical overflow weir having a 0.05 m height and a vertical weir on the boundary of the liquid receiving area and the bubble area having a height of 0.02 m. Water and air were contacted. At an air load of 500 $m^3/h$ it was observed that the maximum attainable water load was 18.4 $m^3/h$.

COMPARATIVE EXPERIMENT

Example 1 was repeated except that no weir was present on the boundary of the liquid receiving area and the bubble area. At an air load of 500 $m^3/h$ it was observed that the maximum attainable water load was 12.3 $m^3/h$.

I claim:

1. A gas-liquid contacting column comprising:
   a plurality of axially spaced contacting trays comprising:
   one or more liquid receiving areas; and,
   one or more sloped downcomers, which liquid receiving areas and downcomers are spaced in a bubble area and which each downcomer has at its upper end a liquid receiving opening and at its lower end a cover plate comprising one or more downward directed liquid discharging openings, which openings are positioned above the liquid receiving area of the consecutive lower contacting tray and positioned at more than about 10% of the tray spacing above this liquid receiving area, having a weir situated along a boundary of the liquid receiving area and the bubble area.

2. The column of claim 1, in which the vertical height of the weir is less than 50% of the distance between the liquid discharge opening of the upper tray and the liquid receiving area.

3. The column of claim 2, in which the vertical height of the weir is between 0.01 and 0.05 m.

4. The column of claim 1, in which the downcomer has a square, rectangular, circular or segmental cross-section at tray level.

5. The column of claim 4, in which the downcomer is a rectangular downcomer.

6. The column of claim 5, in which the liquid discharge openings and the corresponding liquid receiving areas are situated along the length of the lower end of the rectangular downcomer.

7. The column of claim 1, in which the weir contains openings.

* * * * *